(12) United States Patent
Burrell et al.

(10) Patent No.: US 8,786,251 B2
(45) Date of Patent: Jul. 22, 2014

(54) CLIP-ON CHARGING SYSTEM WITH VARIABLE CHARGING RATES

(75) Inventors: Douglas Burrell, Waterloo (CA); Steven Henry Fyke, Waterloo (CA); Jerome Pasquero, Kitchener (CA); David Ryan Walker, Waterloo (CA)

(73) Assignee: BlackBerry Limited, Waterloo (CA)

( * ) Notice: Subject to any disclaimer, the term of this patent is extended or adjusted under 35 U.S.C. 154(b) by 448 days.

(21) Appl. No.: 13/273,795

(22) Filed: Oct. 14, 2011

(65) Prior Publication Data
US 2013/0099725 A1     Apr. 25, 2013

(51) Int. Cl.
*H02J 7/00*     (2006.01)

(52) U.S. Cl.
USPC .............. 320/107; 320/113; 320/115

(58) Field of Classification Search
USPC .......................... 320/107, 113, 115
See application file for complete search history.

(56) References Cited

U.S. PATENT DOCUMENTS

| | | | |
|---|---|---|---|
| 4,092,580 A * | 5/1978 | Prinsze | 320/115 |
| 4,334,732 A * | 6/1982 | Roeschlein et al. | 439/248 |
| 4,739,242 A * | 4/1988 | McCarty et al. | 320/110 |
| 5,914,585 A | 6/1999 | Grabon | |
| 6,350,040 B1 * | 2/2002 | Parker | 362/183 |
| 6,828,759 B1 | 12/2004 | Xiong et al. | |
| 6,909,260 B2 * | 6/2005 | Parker | 320/107 |
| 7,926,971 B2 * | 4/2011 | West et al. | 362/183 |
| 2003/0003971 A1 | 1/2003 | Yamamoto | |
| 2006/0232239 A1 * | 10/2006 | Maglica et al. | 320/107 |
| 2006/0238289 A1 | 10/2006 | Marmaropoulos et al. | |
| 2008/0231113 A1 | 9/2008 | Guccione et al. | |
| 2010/0194206 A1 | 8/2010 | Burdo et al. | |
| 2011/0169451 A1 * | 7/2011 | Stampfli | 320/115 |

FOREIGN PATENT DOCUMENTS

| | | |
|---|---|---|
| EP | 1610439 A1 | 12/2005 |
| WO | 2010/050958 A1 | 5/2010 |

OTHER PUBLICATIONS

Extended European Search Reported dated Apr. 2, 2012 on related European patent application No. 11185160.6; 4 pages.
Powered by Lenmar®; "PowerPort™ Clip Universal USB Charger"; Lenmar Enterprises, Inc.: 2011: Available online: http://www.lenmar.com/Uploads/File/Literature_Sheets/PPUCLIP.pdf; 1 page.
Duracell myGrid™ Operation Manual; Steps 1-8; 2 pages.

* cited by examiner

*Primary Examiner* — M'Baye Diao
(74) *Attorney, Agent, or Firm* — Ridout & Maybee LLP

(57) ABSTRACT

A charger for charging a battery of an electronic device is provided. The electronic device has a charging clip that clips to a structure of the charger. The structure has a plurality of conductive strips disposed thereon. The number of conductive strips contacted by a charging contact on the charging clip determines the amount of current provided to the electronic device for charging.

20 Claims, 19 Drawing Sheets

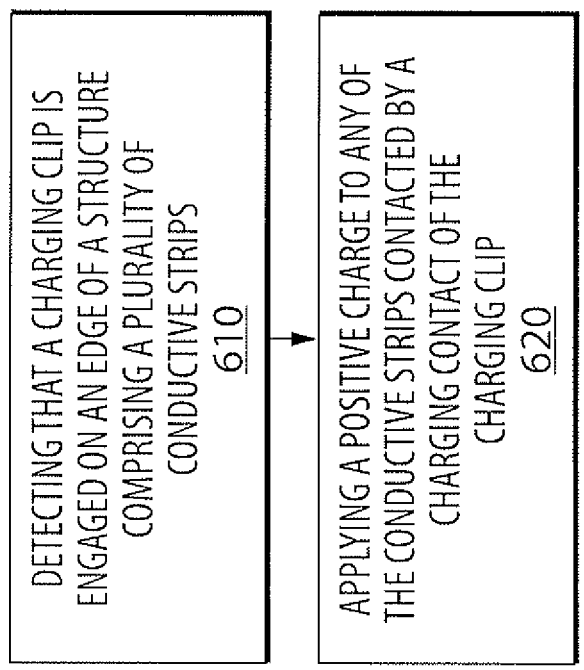

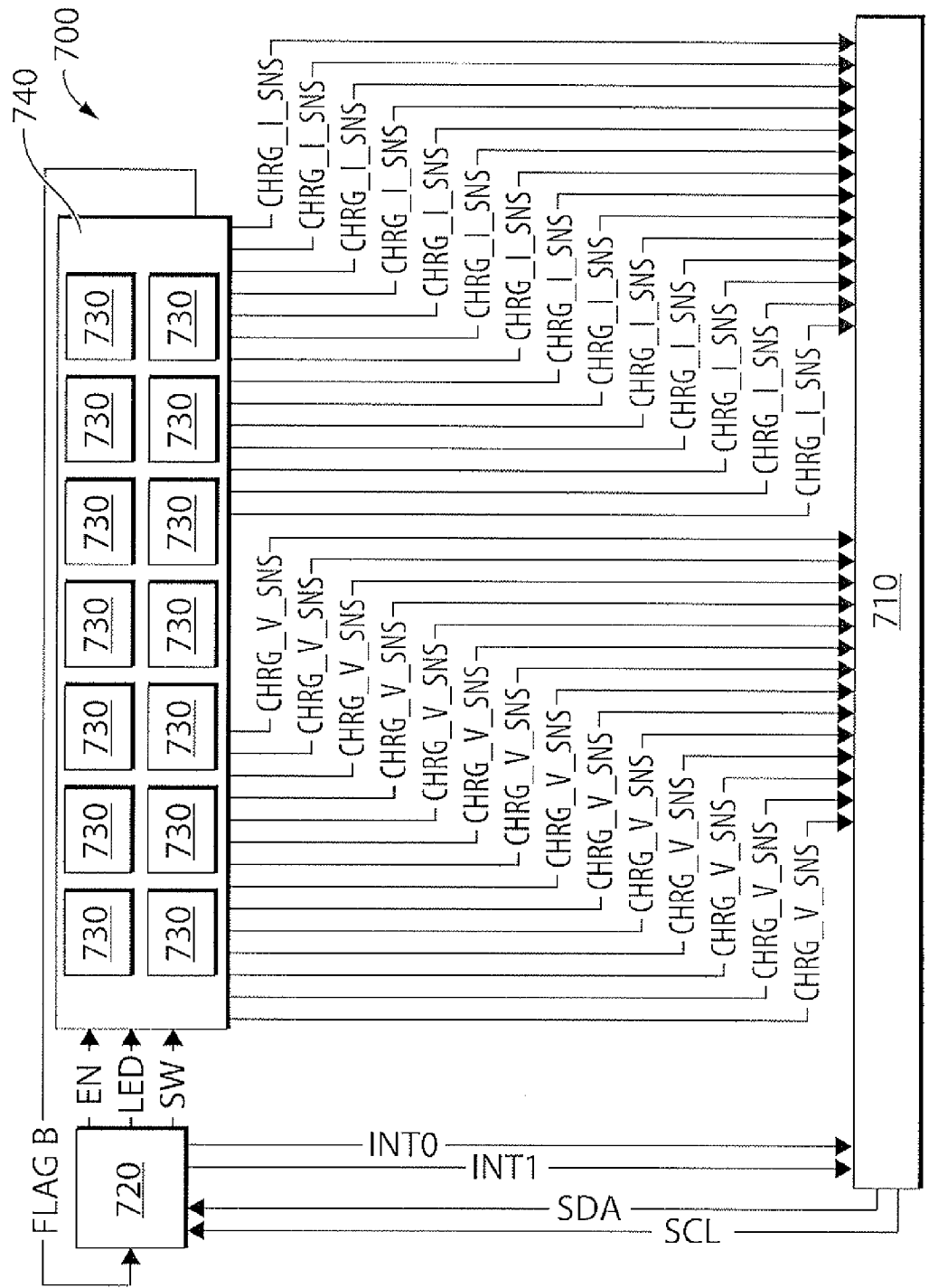

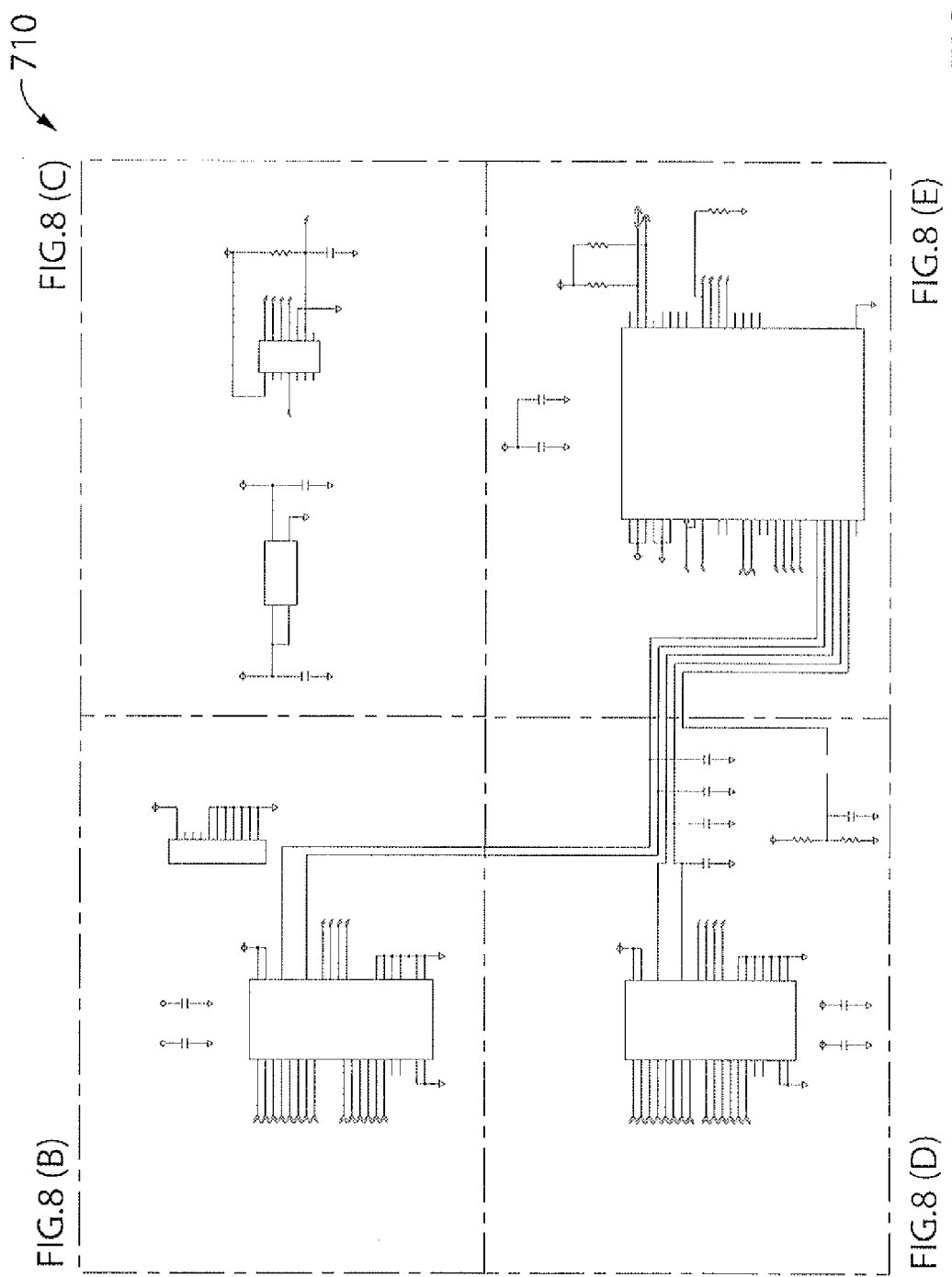

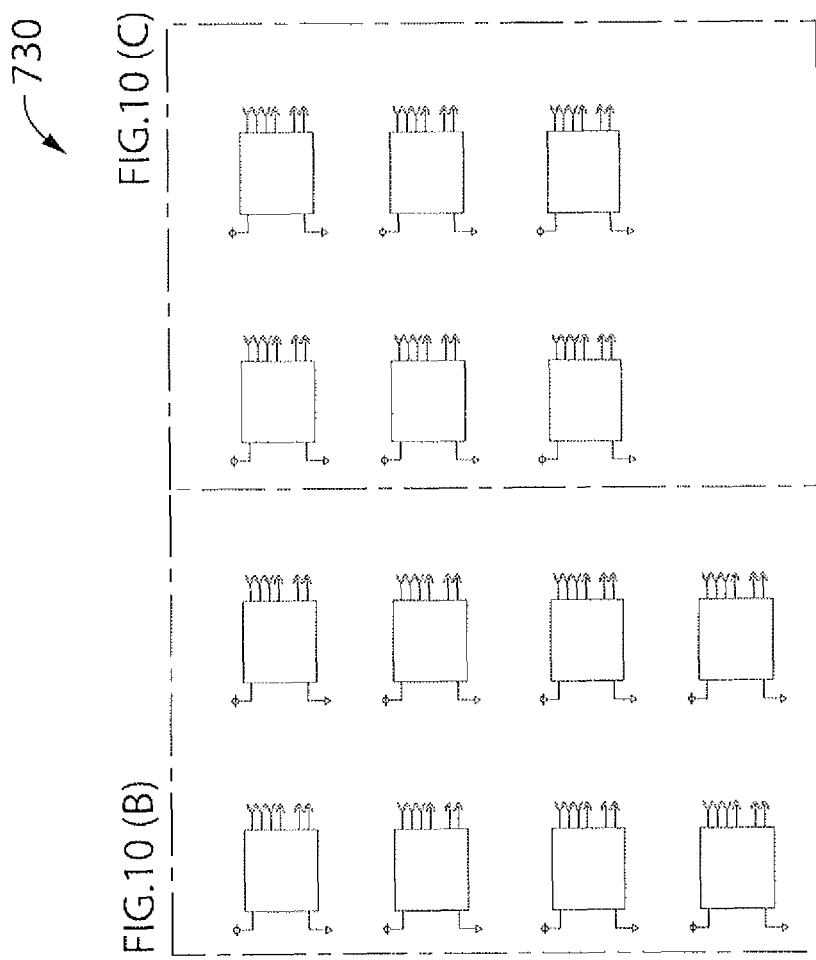

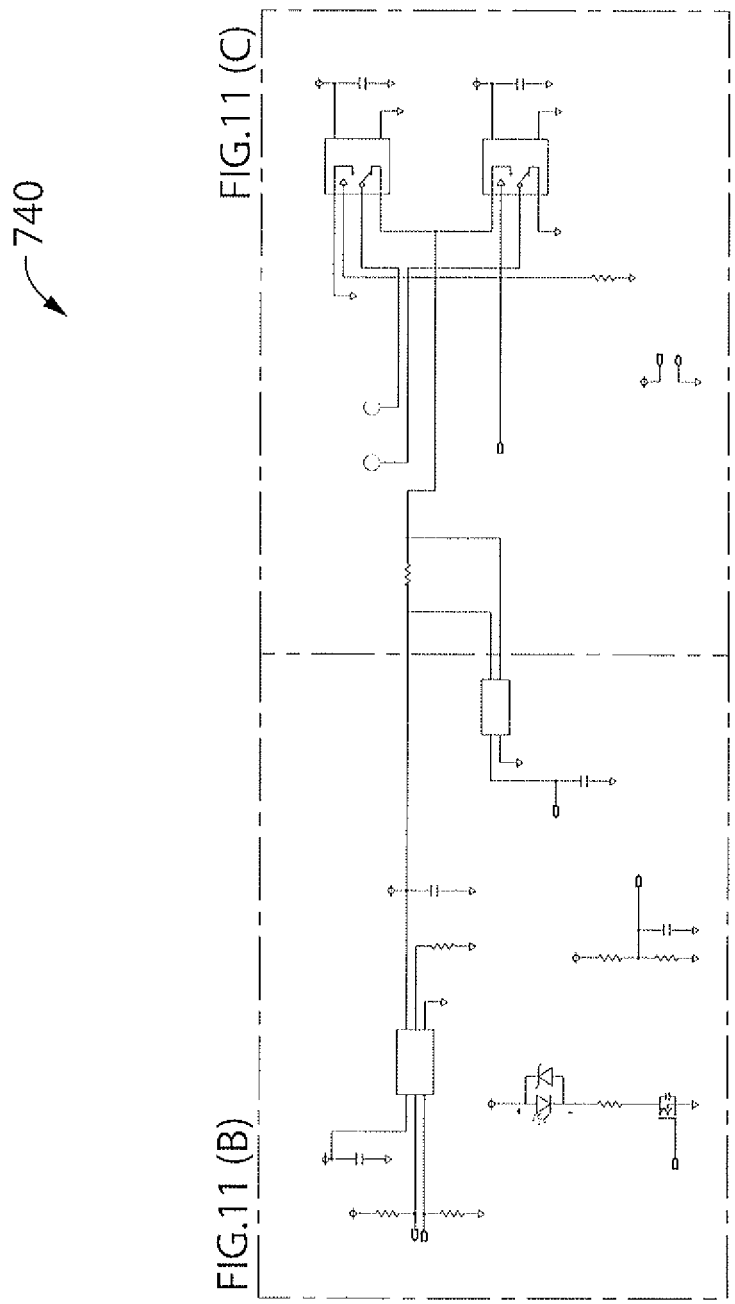

US 8,786,251 B2

CLIP-ON CHARGING SYSTEM WITH VARIABLE CHARGING RATES

TECHNICAL FIELD

The present disclosure relates generally to a charger for charging a battery of an electronic device.

BACKGROUND

Many electronic devices are battery operated and have rechargeable batteries. In many such devices, the batteries are charged while in the device and thus, the electronic device also includes a charging system for charging the batteries. Different electronic devices have different current and voltage requirements and thus have different sizes of batteries. The number and size of battery determine the current required to charge the batteries of an electronic device.

Some electronic devices include a USB port through which the batteries can be charged, by either connecting to a USB port of a computer system or to an AC/DC adapter connected to a wall outlet.

Some electronic devices have a docking station, with connectors for charging the device.

BRIEF DESCRIPTION OF THE DRAWINGS

FIG. 6 is a flowchart of a method in accordance with one example embodiment of the present disclosure;

FIG. 7 is a block diagram illustrating a charger in accordance with one example embodiment of the present disclosure;

Like reference numerals are used in the drawings to denote like elements and features.

DETAILED DESCRIPTION OF EXAMPLE EMBODIMENTS

Figure 1:
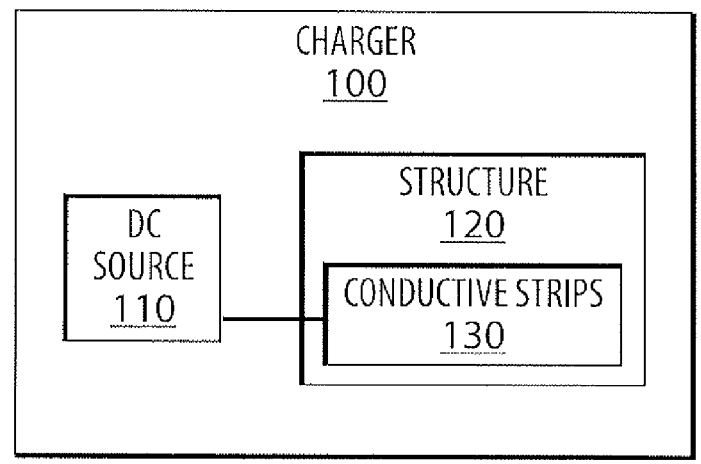
FIG. 1 is a block diagram illustrating a charger in accordance with one example embodiment of the present disclosure.

Users often carry a number of electronic devices with rechargeable batteries. Each device may have different current requirements for charging the batteries. It is inconvenient to have a multitude of charging systems, i.e., one for each electronic device.

The present application proposes a system for charging a number of electronic devices that can adapt to the current requirements of each electronic device. The charging system is designed to charge electronic devices through a charging clip attached to the electronic device. The clip has a charging contact on an interior surface and is clipped to the charger for charging. The charger has a structure with a plurality of charging strips. The more strips that are contacted by the charging contact of the charging clip, the more current that is supplied to the electronic device for charging. Thus, for a device requiring more current, a larger clip is used. Non-limiting examples of electronic devices that could be charged using embodiments of the charger disclosed herein include mobile electronic devices, mobile communication devices, personal digital assistants, tablet devices, e-readers, mobile telephones, MP3 players, portable music players, smart phones, dictation devices, and GPS devices. Some of electronic devices may be handheld, that is, sized and shaped to be held or carried in a human hand. In some circumstances, a battery of an electronic device may be deemed handheld, even if the electronic device is not.

In one aspect of the present invention there is provided a charger for charging a battery of an electronic device having a charging clip, the charger comprising: a direct current source; a structure having an edge onto which the charging clip can be clipped; and a plurality of conductive strips disposed on the structure, the conductive strips running perpendicular to the edge sufficiently close to the edge to engage a charging contact on the charging clip when clipped to the structure and each conductive strip electrically connectable to the direct current source.

In another aspect of the present invention there is provided a charging system for charging a battery of an electronic device, the charging system comprising: a charging clip attachable to the electronic device and including a charging contact on one interior surface of the clip connectable to a charging connection on the electronic device; and a charger including: a direct current source; a structure having an edge onto which the charging clip can be clipped; and a plurality of conductive strips disposed on the structure, the conductive strips running perpendicular to the edge sufficiently close to the edge to engage the charging contact on the charging clip when clipped to the structure and each conductive strip electrically connectable to the direct current source.

In another aspect of the present invention there is provided a method for charging a battery in an electronic device, the method comprising: detecting that a charging clip is engaged on an edge of a structure comprising a plurality of conductive strips running perpendicular to the edge sufficiently close to the edge to engage a charging contact on the charging clip when clipped to the structure; and applying a positive charge to any of the conductive strips contacted by the charging contact.

Referring now to FIG. 1, an example embodiment of a charger 100 will now be described. The charger 100 is for charging a battery of an electronic device having a charging clip. The charger 100 comprises a direct current source 110 and a structure 120 having an edge onto which the charging clip can be clipped. A plurality of conductive strips 130 is disposed on the structure 120. The conductive strips run perpendicular to the edge sufficiently close to the edge to engage a charging contact on the charging clip when clipped to the structure. Each conductive strip 130 is electrically connectable to the direct current source 110.

Figure 2:
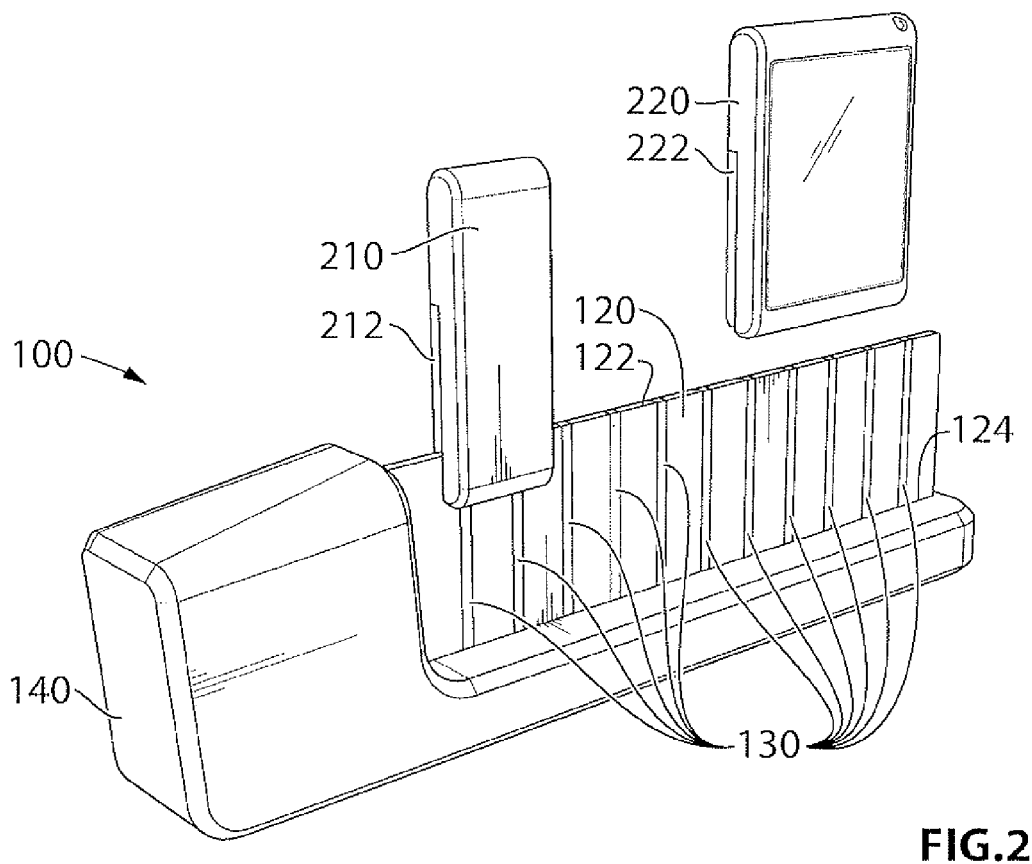
FIG. 2 is a perspective view illustrating a charging system in accordance with one example embodiment of the present disclosure.

A perspective view of an example embodiment of the charger 100 with two electronic devices 210 and 220 is shown in FIG. 2. The structure 120 of the embodiment of FIG. 2 is planar and is supported at a lower edge 124 by a support structure 140. In some embodiments, the structure is a printed circuit board. The conductive strips 130 of the embodiment of FIG. 2 run from an upper edge 122, onto which the electronic devices 210 and 220 clip to the lower edge of the structure 120 and are all of the same size and parallel (geometrically or physically parallel, not necessarily electrically connected in parallel) to each other. Device 210 has a clip 212 sized to engage two conductive strips 130 when clipped to the upper edge of the structure 120. Device 220 has a clip 222 sized to engage four conductive strips 130 when clipped to the upper edge of the structure 120.

In some embodiments, the support structure 140 houses the DC source 110. In some embodiments, the support structure includes an AC/DC adapter for connecting to a wall outlet that supplies AC (Alternating Current).

It is to be understood that the charger 100 is not limited to the embodiment shown in FIG. 2. In some embodiments, the structure includes grooves, slots, curves or protrusions and the clips 212 and 222 have a corresponding shape so as to guide the clips into a position that ensures engagement with an appropriate number of conductive strips 130.

In some embodiments, the conductive strips are partially covered by the structure 120 and only exposed where the clips engage the structure. It is also to be understood that the conductive strips are not limited to the shape shown in FIG. 2. Any feasible shape can be adopted.

In some embodiments, the conductive strips are electrically connected to each other in parallel. Components electrically connected in parallel may be, but need not be, physically parallel to one another. As used herein, components are electrically connected in parallel when they bridge the same voltage drop (that is, they are in a strict electrically parallel configuration) or substantially the same voltage drop (that is, they behave substantially like components in a strict electrically parallel configuration).

In some embodiments of the charger 100, each conductive strip is connectable to the direct current source through a switch. In this manner, current can be applied to any conductive strip in contact with a charging clip by closing the switch for that conductive strip.

In some embodiments, each conductive strip is connectable to ground and the direct current source through one or more switches. In some embodiments a single pole, double-throw analog switch is used. In some embodiments there are conductive strips on opposing sides of the structure. In some embodiments, the switches connect conductive strips in contact with a charging contact of a clip to the DC source and conductive strips in contact with a negative contact or ground on the clip to ground. In some embodiments, the switches are controlled by a controller.

In some embodiments, the structure comprises a first side and a second side opposing the first side and each of the first side and the second side has an equal number of the conductive strips located thereon. In some embodiments, the structure comprises a first side and a second side opposing the first side, the first side comprising the plurality of conductive strips and the second side comprising one or more conductive contacts connectable to ground.

In some embodiments, a pair of the conductive strips comprises a first conductive strip on the first side and a second conductive strip on the second side directly opposite the first conductive strip and the first conductive strip and the second conductive strip are each connected to a switch such that the first conductive strip is connected to ground whenever the second conductive strip is connected to the direct current source. In some embodiments, the conductive strips on one side of the structure alternate between ground and positive and the charging clip has corresponding alternating strips on one interior surface.

In some embodiments, the charger includes a conductive contact connectable to ground positioned to engage a ground contact on the charging clip. In some embodiments, the conductive contact connectable to ground is on a side opposite the conductive strips. In other embodiments, the conductive contact connectable to ground is along the upper edge 122 of the structure 120. In some embodiments, for each conductive strip, there is a corresponding conductive contact connectable to ground. In some embodiments, for each conductive strip, there is a corresponding second conductive strip configured such that when one of the two conductive strips is connected to ground, the other of the two conductive strips is connected to the direct current source.

In some embodiments, the charger includes a controller configured to detect a polarity of the charger clip when engaged on the edge in contact with at least one of the conductive strips and to match the polarity of the at least one of the conductive strips to the polarity of the charging clip. In some embodiments, a sensor detects the polarity and sends a signal indicating the polarity to the controller. In some embodiments, the charger includes a sensor to detect a polarity of a contact engaged with at least one of the conductive strips and a controller to instruct the at least one conductive switch to connect to ground if the contact is negative and to the direct current source if the contact is positive.

In some embodiments, the direct current source comprises an AC/DC (Alternating Current/Direct Current) adapter.

Figure 3:
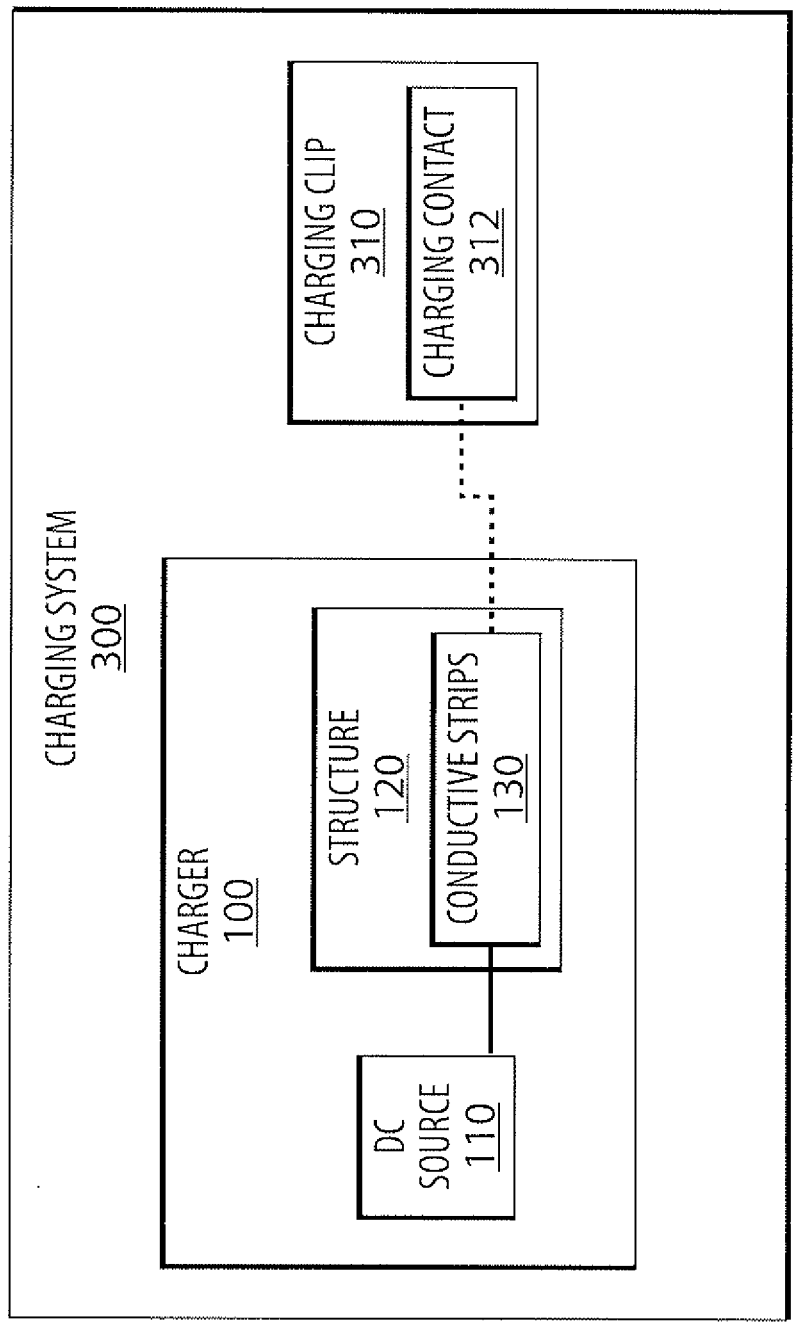
FIG. 3 is a block diagram illustrating a charging system in accordance with one example embodiment of the present disclosure.

Referring to FIG. 3, a charging system 300 will now be described. The charging system 300 is charging a battery of an electronic device and comprises a charging clip 310 and a charger 100. The charging clip 310 is attachable to the electronic device. The charging clip 310 includes a charging contact 312 on one interior surface of the clip connectable to a charging connection on the electronic device; and a charger 100 including: a direct current source 110; a structure 120 having an edge 122 onto which the charging clip can be clipped; and a plurality of conductive strips 130 disposed on the structure, the conductive strips running perpendicular to the edge sufficiently close to the edge to engage the charging contact on the charging clip when clipped to the structure and each conductive strip electrically connectable to the direct current source.

In some embodiments, the charging clip further comprises a negative contact and the charger comprises at least one conductive contact connectable to ground positioned to engage the negative contact when the charging clip is engaged on the edge.

In some embodiments, the charger further comprises a controller configured to detect a polarity of the charger clip when engaged on the edge in contact with at least one of the conductive strips and to match the polarity of the at least one of the conductive strips to the polarity of the charging clip.

Figure 4:
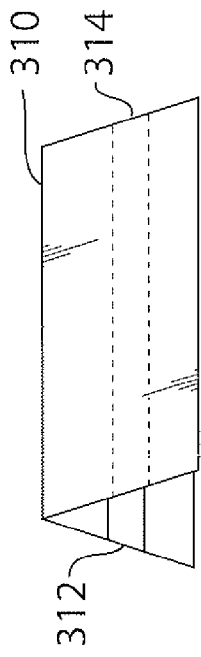
FIG. 4 is a perspective view illustrating a charging clip in accordance with one example embodiment of the present disclosure.

Referring to FIG. 4, an embodiment of the charging clip 310 will be described. The charging clip 310 in this embodiment has one charging contact 312 that extends across the width of on interior surface of the clip. The charging contact 312 is connectable electrically to the positive terminal of a battery of an electronic device onto which the charging clip is attachable. The charging clip 310 of the embodiment of FIG. 4 also comprises a negative contact 314 that extends the width of an interior surface of the charging clip 310 facing the charging contact 312. The negative contact is connectable electrically to the negative terminal of the battery when the charging clip is attached to the electronic device. Although not shown in FIG. 4, the charging clip 310 may include any kind of mechanical apparatus or structure (such as a spring or a hook or a textured surface) to assist with attaching the charging clip to an electronic device or engaging the charging clip with a charger. It is to be understood that the embodiment of the charging clip shown in FIG. 4 is one example embodiment and other configurations are feasible. For example, the charging contact 312 can comprise a plurality of conductive strips.

Figure 5:
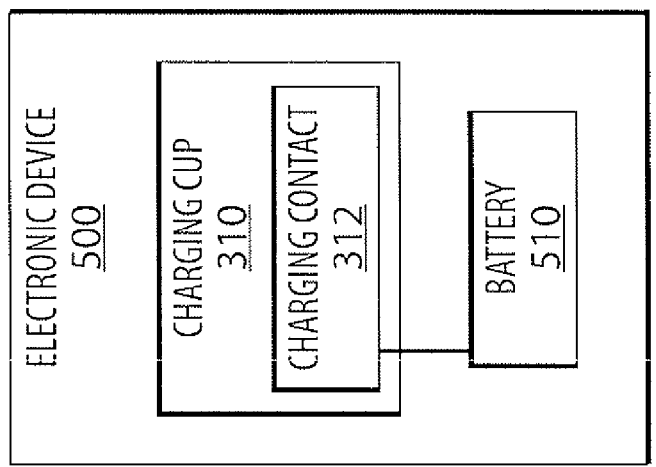
FIG. 5 is a block diagram illustrating an electronic device in accordance with one example embodiment of the present disclosure.

FIG. 5 is a block diagram of an electronic device 500 with the charging clip 310 installed thereon. The charging contact 312 of the charging clip 310 is connectable to a battery 510 of the electronic device 500. Examples of the battery 510 include, but are not limited to Lithium Ion or Lithium Polymer batteries which all are rated for 4.2V DC, with a size in mA/hour anywhere from 900 to 1500, generic Lithium Ion and Lithium Polymer batteries that operate up to 4.2V and can range in capacity anywhere from 100 mA/h to 1000 mA/h, and Lithium Polymer batteries operating at 4.2V and with a capacity from 100 mA/h to 250 mA/h. Non-limiting examples of the electronic device 500 include mobile electronic devices, mobile communication devices, personal digital assistants, tablet devices, e-readers, mobile telephones, MP3 players, portable music players, smart phones, dictation devices, GPS devices and wireless electronic accessories, such as earbuds, headphones and Bluetooth™ enabled devices.

Referring now to FIG. 6, a method for charging a battery in an electronic device will be described. The method comprises a first action 610 of detecting that a charging clip is engaged on an edge of a structure comprising a plurality of conductive strips running perpendicular to the edge sufficiently close to the edge to engage a charging contact on the charging clip when clipped to the structure. Then at action 620, the method continues with applying a positive charge to any of the conductive strips contacted by the charging contact.

In some embodiments, the method further comprises detecting the polarity of the charging clip and connecting any conductive strips in contact with a negative contact or ground on the charging clip to ground.

In some embodiments, the method further comprises detecting the polarity of a portion of the charging clip and signalling a switch connected to at least one conductive strip in contact with the portion to connect the at least one conductive strip to ground or the direct current source such that the at least one conductive strip matches the polarity of the portion of the charging clip.

It is to be understood that the actions of the methods are not limited to the order in which they are described are can be performed in any feasible order.

Figure 8:
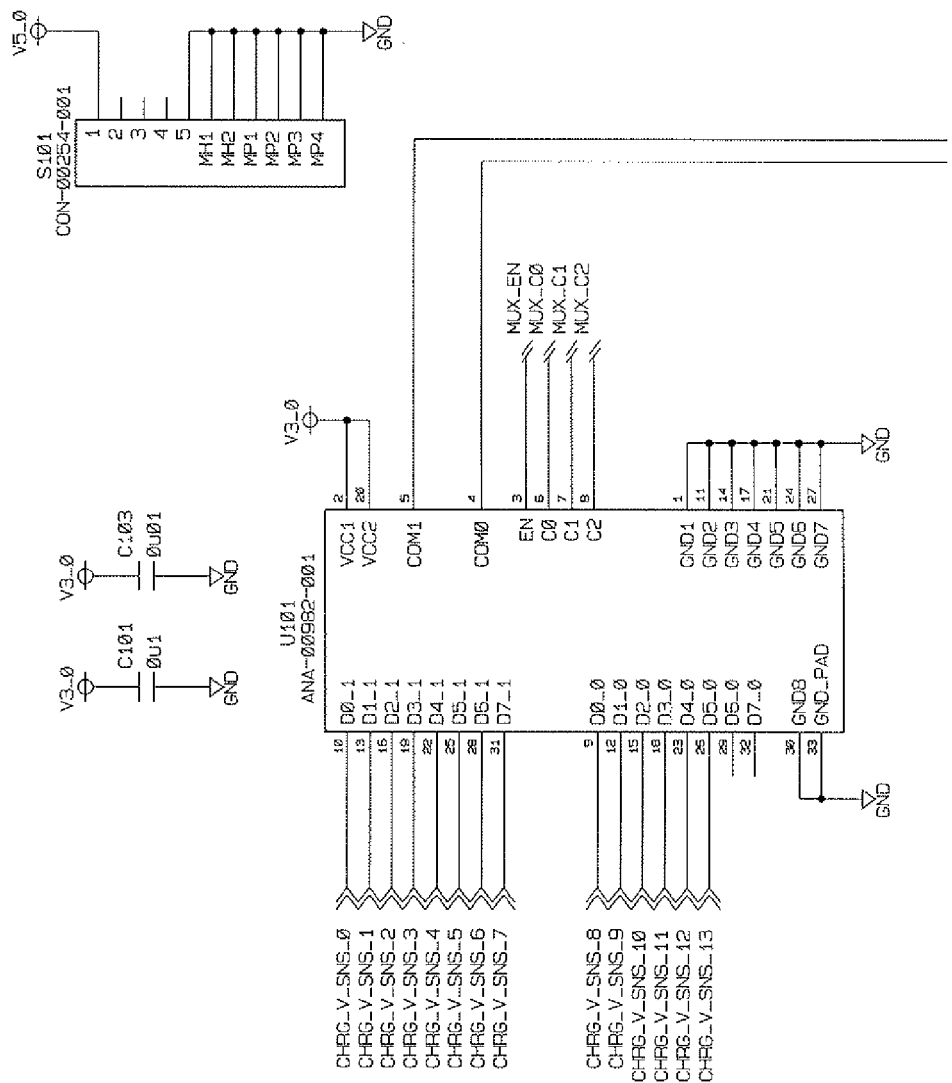
FIGS. 8(A) to 8(E) are schematic diagrams of a control module for the charger in accordance with one example embodiment of the present disclosure.
Figure 8:
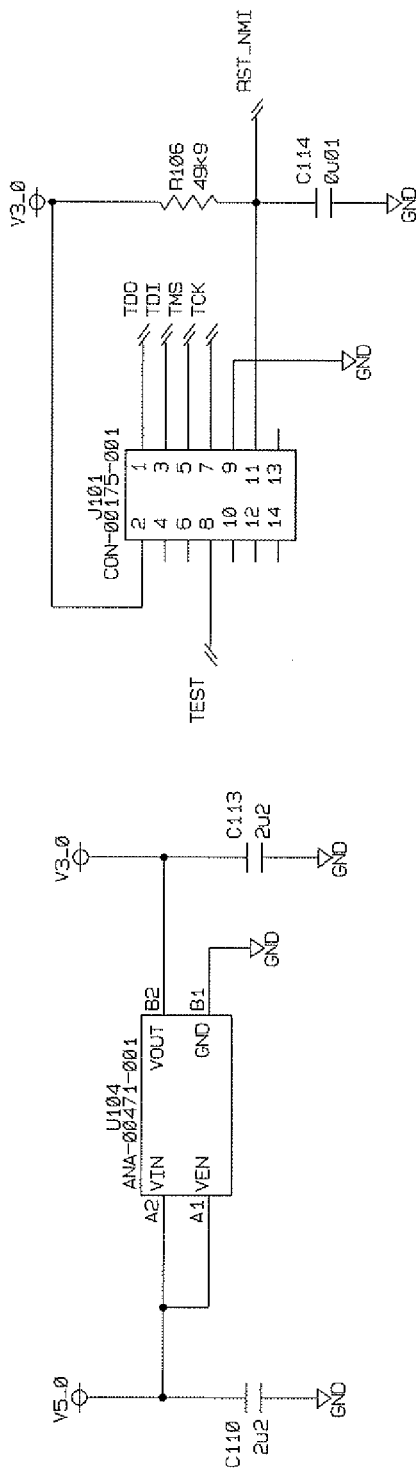
Figure 8:
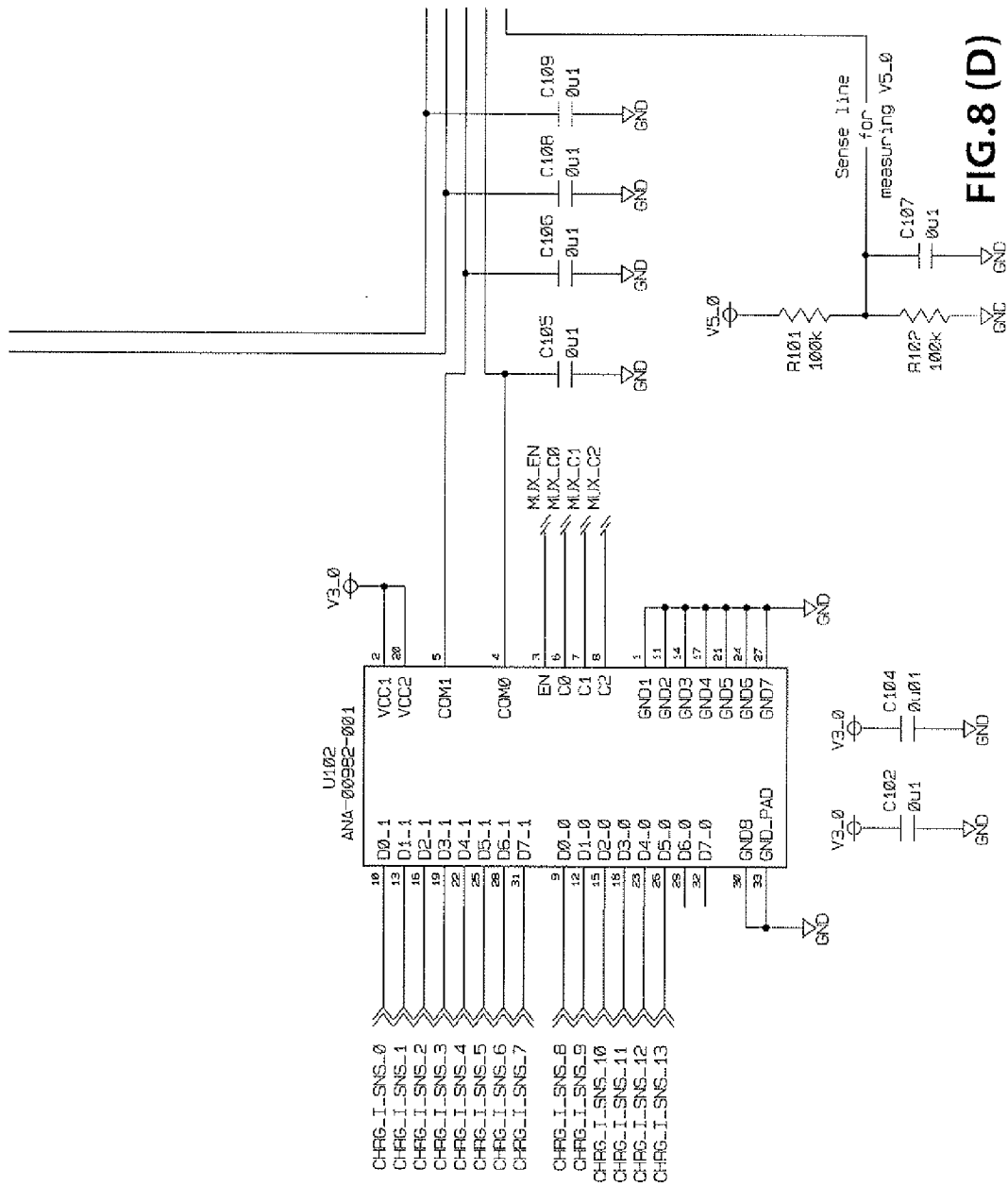
Figure 8:
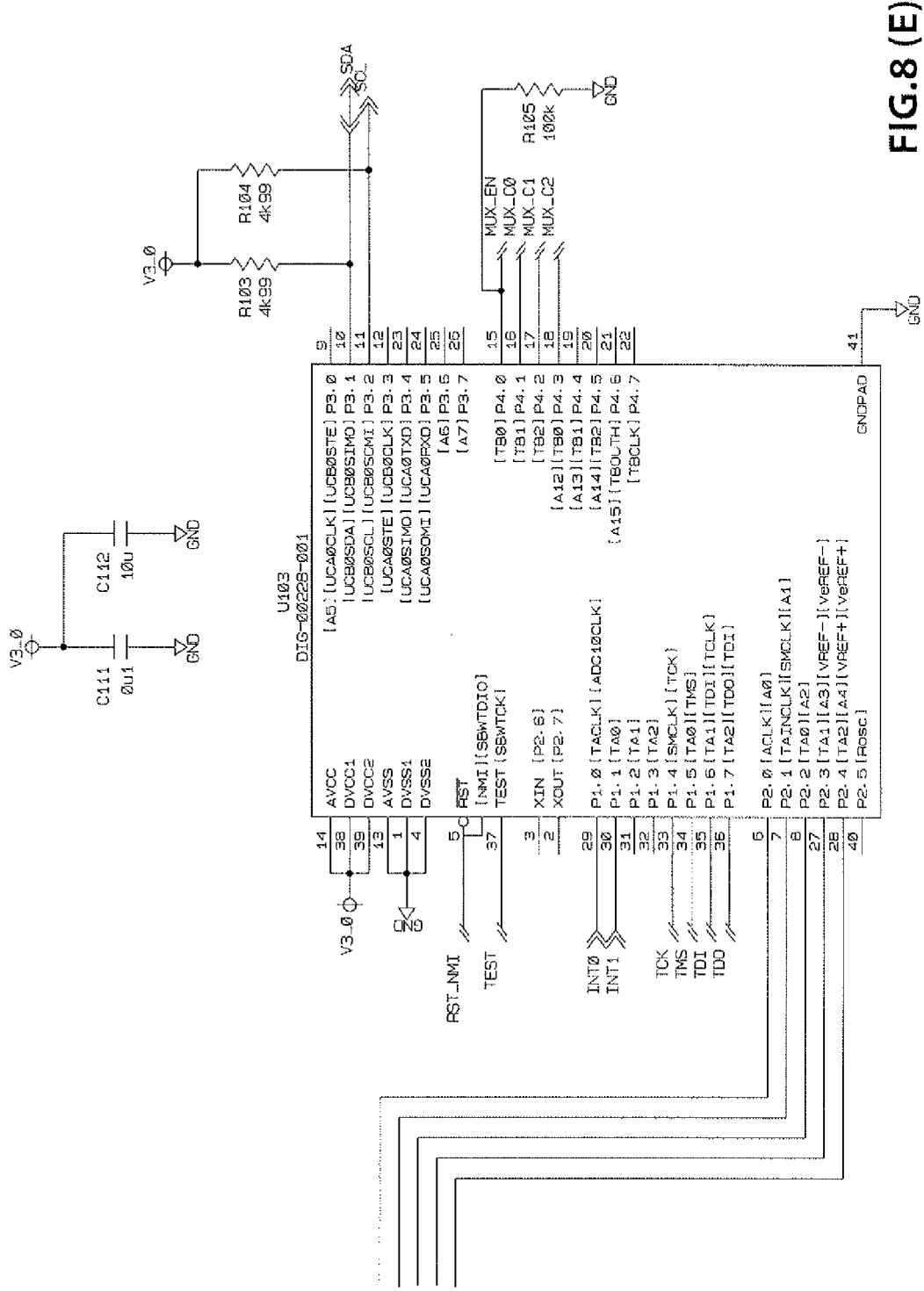

Referring now to FIG. 7, control circuitry for an embodiment of a charger 700 will now be described. A first controller module 710, which will be described in further detail with reference to FIG. 8 provides the control circuitry for controlling which sensors of 14 charging strip modules 740 are connected to a microcontroller U103. One embodiment of the charging strip module 740 is shown in more detail in FIG. 11. A charging module 730 comprises 14 conductive strip modules 740 and also detects the polarity of the clip. A second control module 720 comprises the circuitry to control various signals, such as LED lighting, enabling/disabling and observing the status of each charging strip module 740.

Figure 11:
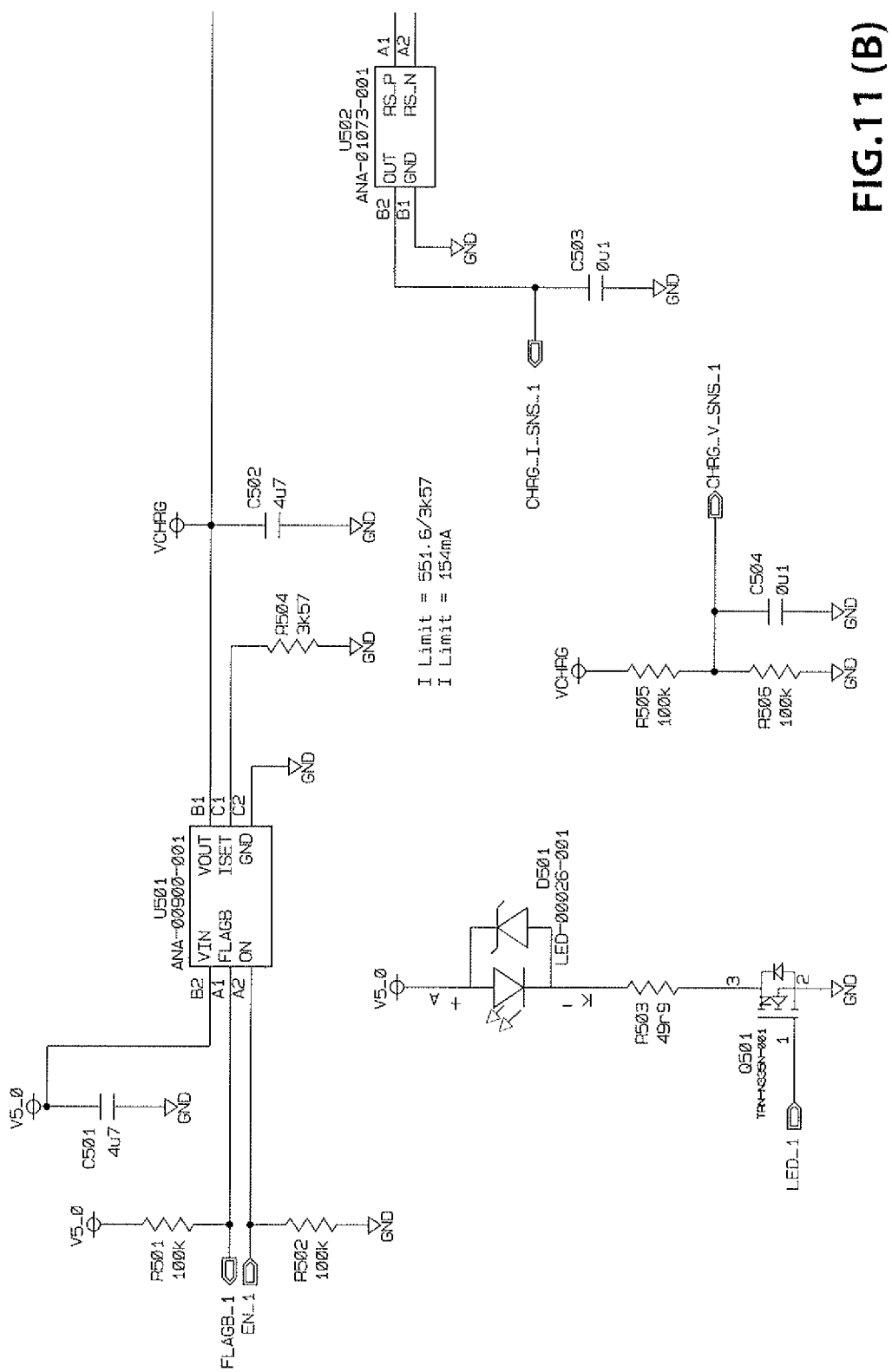
FIGS. 11(A) to 11(C) are schematic diagrams of a conductive strip module in accordance with one example embodiment of the present disclosure.
Figure 11:
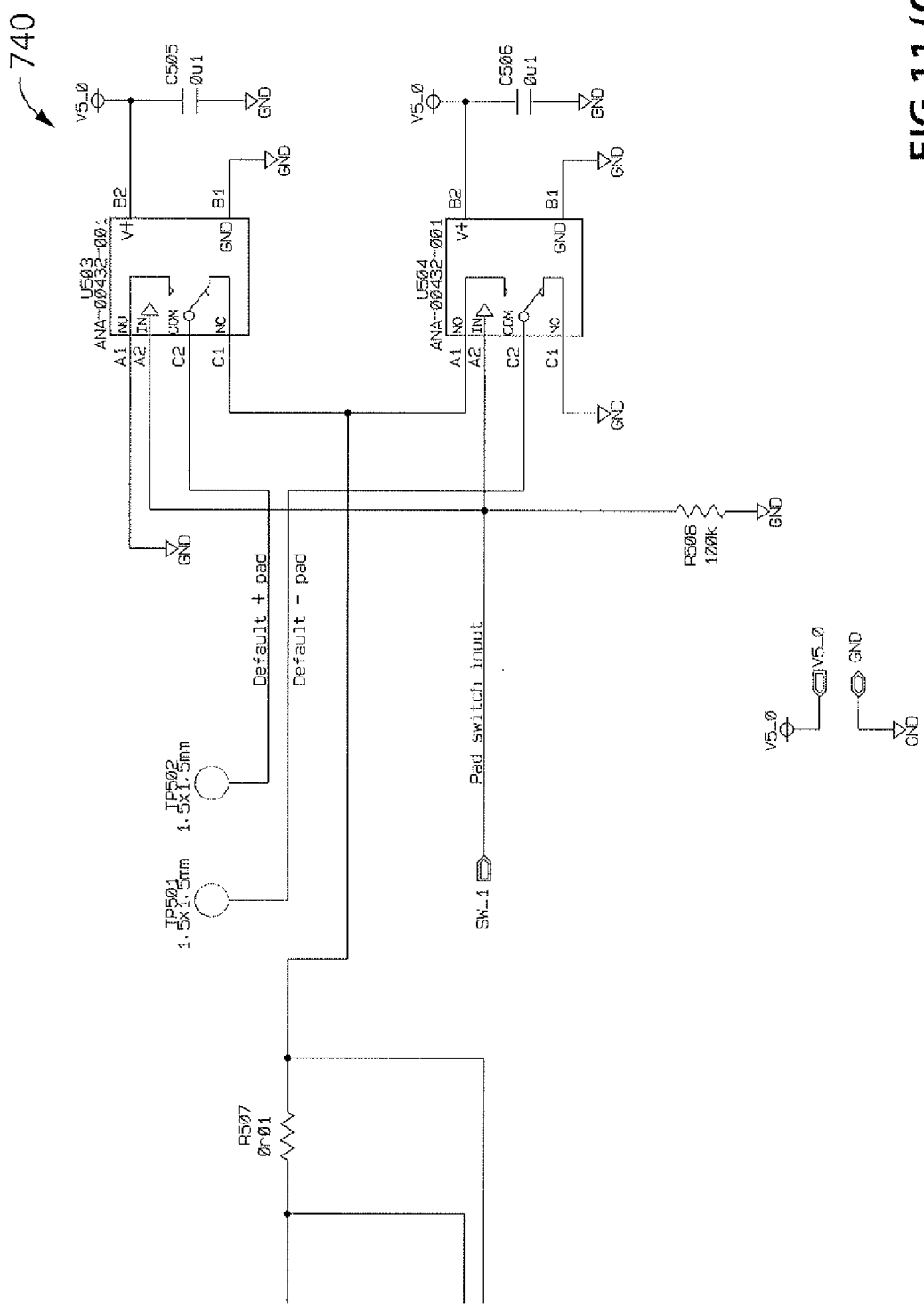

Referring to FIG. 8, the first control module 710 consists of 4 microcontrollers labelled U101, U102, U103 and 0104 that provide the support circuitry for the charging strip modules 740, an example of which is shown in FIG. 11. The 14-bit inputs of sense voltage (CHRG_V_SNS) and sense current (CHRG_I_SNS) are fed into microcontrollers U101 and U102 respectively. CHRG_V_SNS is a signal from sensing module 730 that represents a scaled-down voltage representing the voltage of a charging strip module 740 and CHRG_I_SNS is represents a scaled voltage that is proportionate to the current being delivered to the respective charging strip module 740. U101 and U102 switch the various CHRG_V_SNS and CHRG_I_SNS signals so that only two of each of these signals at a time are connected to U103. U103 is then able to measure the signal that is routed through U101 and 0102. In this way by switching U101 and U102, U103 is able to measure all 14 CHRG_V_SNS and CHRG_I_SNS signals while only requiring the use of 4 measurement inputs versus 28. The outputs from U101 and 0102 feed into U103, which provides a serial data output (SDA) and a serial clock output (SCL). The SDA and SCL outputs are used by U103 to control U201 and U202. U103 does control U101 and 0102 but the outputs it uses for this are MUX_EN, MUX_CO, MUX_C1 and MUX_C2. In an embodiment, the Inter-Inter Circuit ($I^2C$) communication scheme is used between the microcontrollers.

A component J101 generates the TD0, TD1, TMS and TCK that feed into microcontroller U103. The component 3101 and the signals attached to it are all used for programming the microcontroller U103 by a host computer and can be used in some embodiments for debugging software that runs on the microcontroller U103.

Figure 9A:
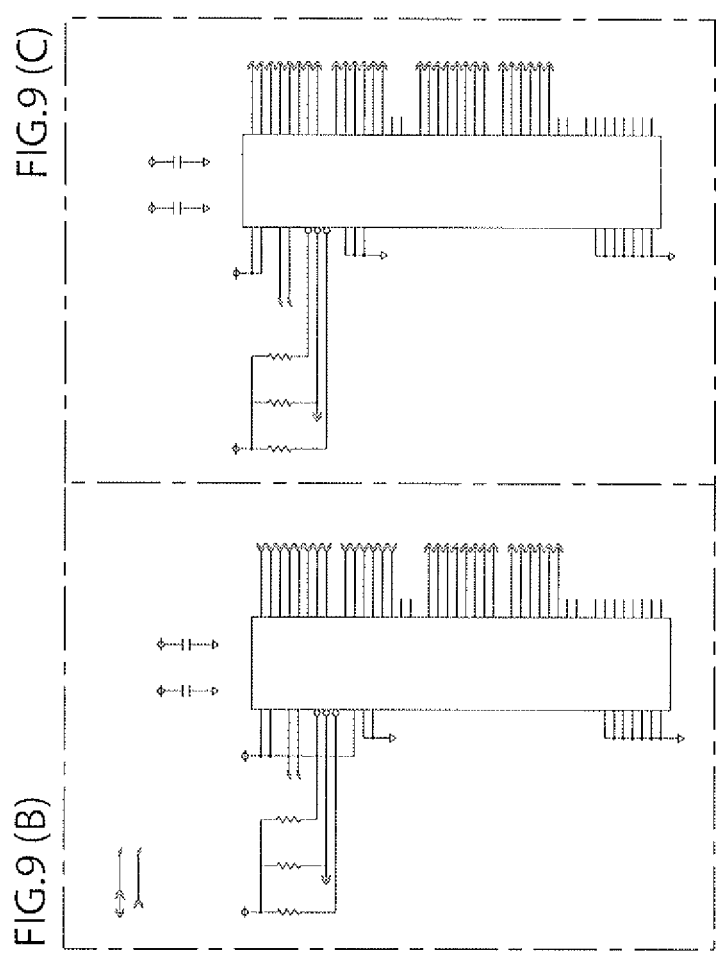
FIGS. 9(A) to 9(C) are schematic diagrams of a control module for the charger in accordance with one example embodiment of the present disclosure.
Figure 9:
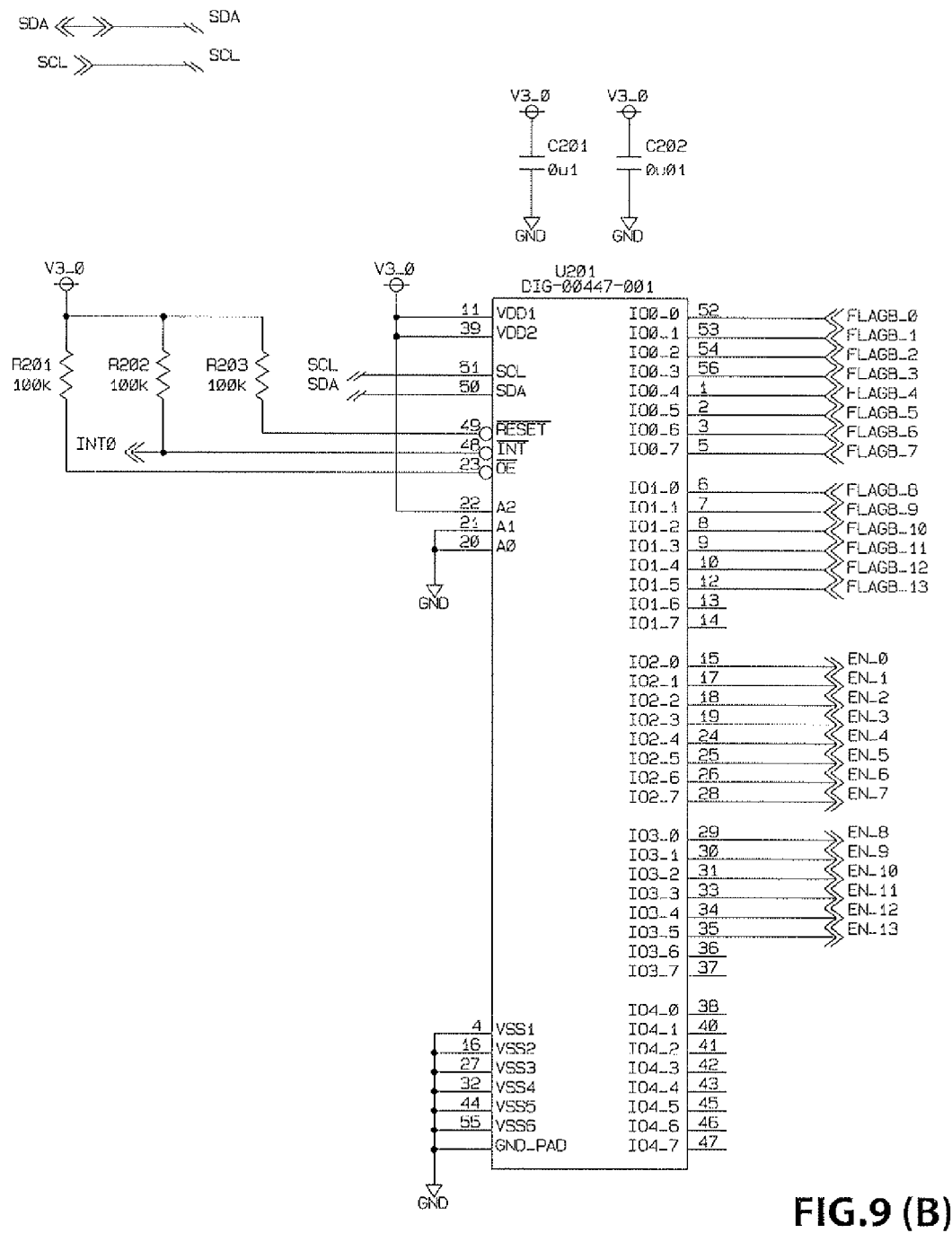
Figure 9:
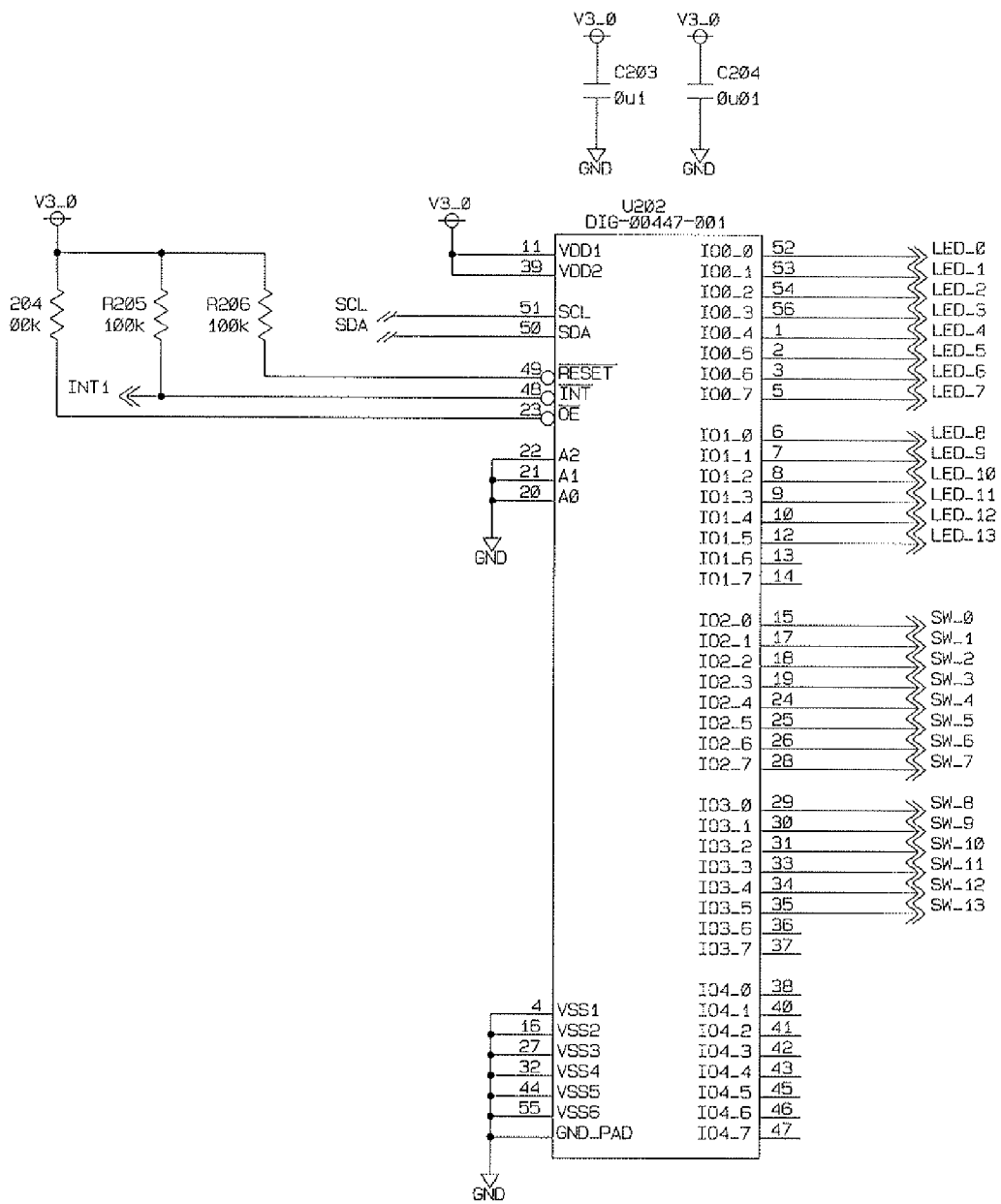

Referring to FIG. 9, the second control module 720 consists of 2 microcontrollers labelled U201 and U202. U201 receives the FLAGB input and provides the EN output. U202 sets the indicator LED and the control line SW. The input and output signals connect into the modules described in Diagram 3. U201 outputs signal INT0 to U103 in module 710 and U202 outputs INT1 to U103. The signals INT0 and INT1 allow microcontrollers U201 and U202 to indicate to U103 that any one of their input or output lines have changed state. This allows U103 to remain idle while there is no activity, when U201 or U202 indicate that a state change has occurred by toggling the INT0 or INT1 signal then U103 is able to communicate through the SDA and SCL signals to U201 or U202 to find out what signal's state has changed.

Figure 10:
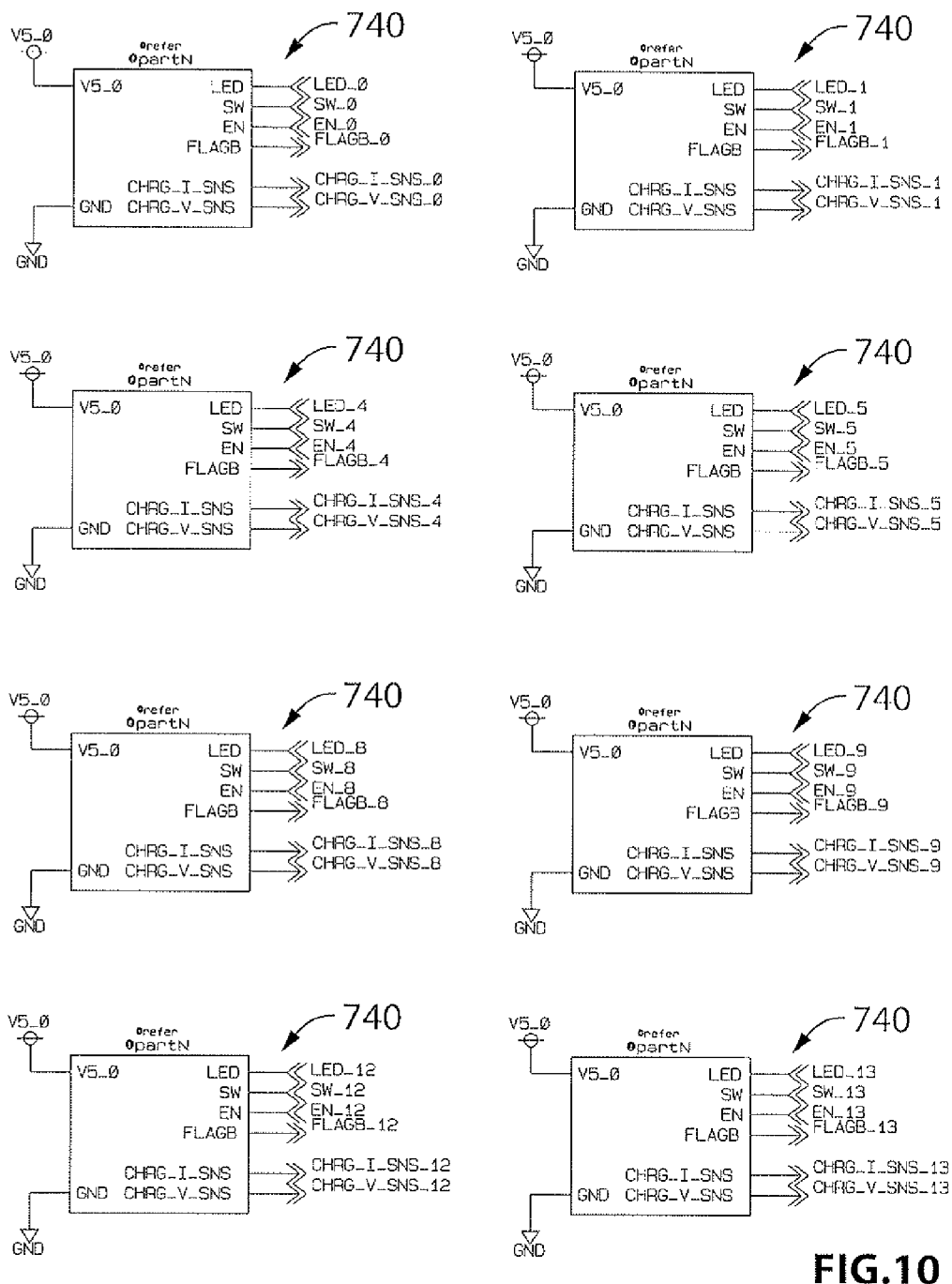
FIGS. 10(A) to 10(C) are schematic diagrams of a charging module in accordance with one example embodiment of the present disclosure.
Figure 10:
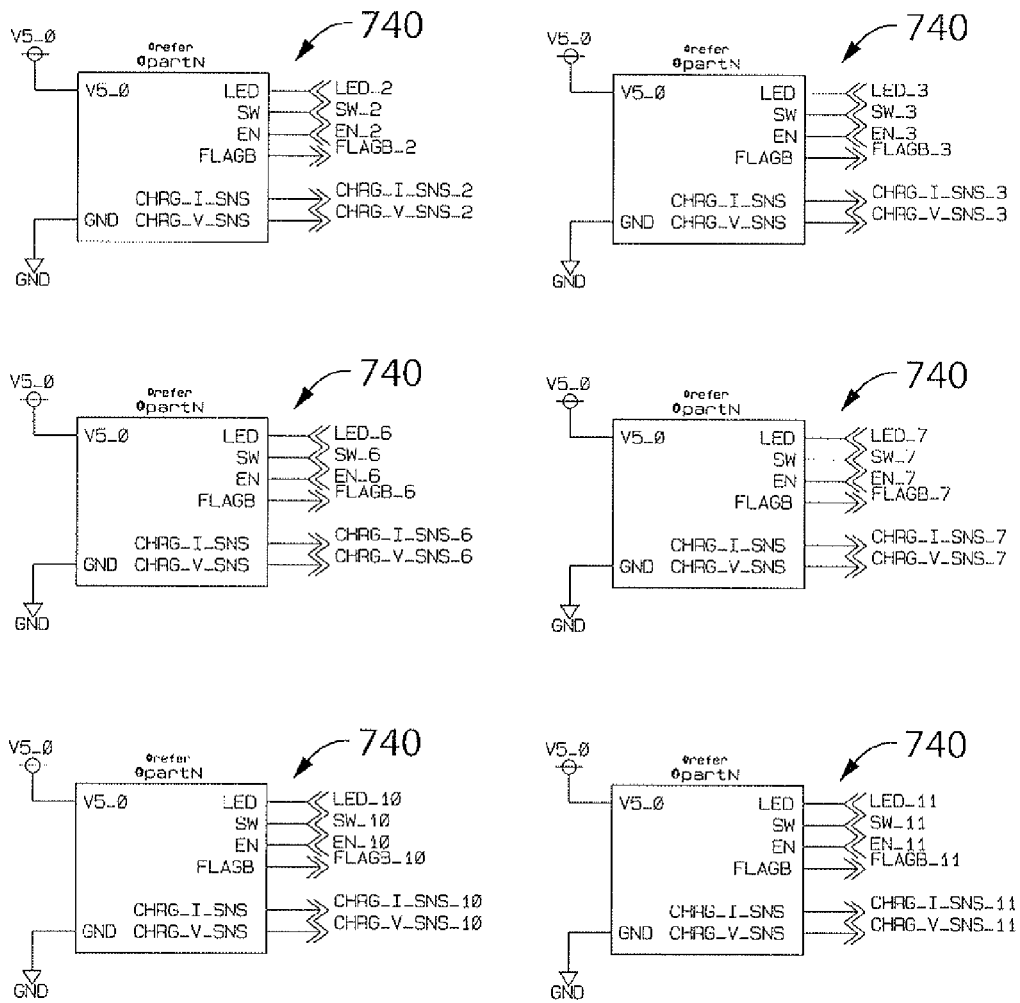

Referring to FIG. 10, the charging module 730 includes 14 instances of the conductive strips modules 740. It is to be understood that any number of conductive strips are possible. In other words, it is not necessary to use all of the pins on the microcontrollers and if additional conductive strips are required, more components can be added to the charger.

The charging module 730 of this embodiment consists of 14 conductive strip modules 740. Each conductive strip module 740 consists of the circuit shown in FIG. 11. The three input and output bits of each conductive strip module 740 are LED, SW, EN and FLAG, CHRG_I_SNS, CHRG_V_SNS, respectively. The LED signal enables or disables an LED light indicating the status of a particular charge strip. The SW signal switches the polarity of the charge strips. The EN signal enables or disables the charge strip. The FLAG signal is a signal that each charge strip circuit uses to alert U103 that its state has changed. The CHRG_I_SNS signal is a scaled voltage proportionate to the current flowing through the charge strip. The CHRG_V_SNS signal is a scaled voltage representing the voltage on the charge strip.

Referring to FIG. 11, each conductive strip module 740 consists of two charge strips TP501 and TP502 and two microcontrollers, U501 and U502. U501 is a load switch with a variable current limit. In this non-limiting example, the current limit is set to 154 mA. This circuit is basically the power source behind one charge source or one "charge strip".

U502 is a current sense amplifier which measures the current flowing through the current sense resistor, R507.

Also included in the conductive strip module 730 is an indicator LED D501 to alert the user of the status of the charge strip. A single LED input bit connects to D501.

The output supplied by U501 is fed to two single pole double throw analog switches, U503 and U504. In U503, the output is fed to its normally-closed contact and in U504 to its normally-open contact. On both of these analog switches, their other normally-open or normally-closed contact is connected to ground.

The switches U503 and U504 are connected opposite to each other. They are both controlled by the same control line, SW. By toggling the control line, the polarity of the charge strips, TP501 and TP502, is switched. One of the charge strips is always positive and the other is always ground.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A charger for charging a battery of an electronic device having a charging clip, the charger comprising;
   a direct current source;
   a structure having an edge onto which the charging clip can be clipped; and
   a plurality of conductive strips disposed on the structure, the conductive strips running perpendicular to the edge sufficiently close to the edge to engage a charging contact on the charging clip when clipped to the structure and each conductive strip electrically connectable to the direct current source.

2. The charger of claim 1, wherein each conductive strip is connectable to the direct current source through a switch.

3. The charger of claim 1, wherein each conductive strip is connectable to ground and the direct current source through one or more switches.

4. The charger of claim 3, further comprising:
   a sensor to detect a polarity of a contact engaged with at least one of the conductive strips; and
   a controller to instruct the one or more switches connected to the at least one conductive strips to connect to ground if the contact is negative and to the direct current source if the contact is positive.

5. The charger of claim 1, wherein the structure comprises a first side and a second side opposing the first side and each of the first side and the second side has an equal number of the conductive strips located thereon.

6. The charger of claim 5, wherein a pair of the conductive strips comprises a first conductive strip on the first side and a second conductive strip on the second side directly opposite the first conductive strip, and the first conductive strip and the second conductive strip are each connected to a switch such that the first conductive strip is connected to ground whenever the second conductive strip is connected to the direct current source.

7. The charger of claim 1, wherein the structure comprises a first side and a second side opposing the first side, the first side comprising the plurality of conductive strips and the second side comprising one or more conductive contacts connectable to ground.

8. The charger of claim 1, wherein the structure is planar.

9. The charger of claim 1, further comprising a conductive contact connectable to ground positioned to engage a negative contact on the charging clip.

10. The charger of claim 1, wherein the conductive strips are arranged in parallel physically.

11. The charger of claim 1, wherein the conductive strips are electrically connected to each other in parallel.

12. The charger of claim 1, further comprising:
   a controller configured to detect a polarity of the charger clip when engaged on the edge in contact with at least one of the conductive strips and to match the polarity of the at least one of the conductive strips to the polarity of the charging clip.

13. The charger of claim 1, further comprising for each conductive strip, a corresponding second conductive strip configured such that when one of the two conductive strips is connected to ground, the other of the two conductive strips is connected to the direct current source.

14. The charger of claim 1, wherein the direct current source comprises an AC/DC (Alternating Current/Direct Current) adapter.

15. A charging system for charging a battery of an electronic device, the charging system comprising:
   a charging clip attachable to the electronic device and including a charging contact on one interior surface of the clip connectable to a charging connection on the electronic device; and
   a charger including:
      a direct current source;
      a structure having an edge onto which the charging clip can be clipped; and
      a plurality of conductive strips disposed on the structure, the conductive strips running perpendicular to the edge sufficiently close to the edge to engage the charging contact on the charging clip when clipped to the structure and each conductive strip electrically connectable to the direct current source.

16. The charging system of claim 15, wherein the charging clip further comprises a negative contact and the charger comprises at least one conductive contact connectable to ground positioned to engage the negative contact when the charging clip is engaged on the edge.

17. The charging system of claim 15, wherein the charger further comprises a controller configured to detect a polarity of the charger clip when engaged on the edge in contact with at least one of the conductive strips and to match the polarity of the at least one of the conductive strips to the polarity of the charging clip.

18. A method for charging a battery in an electronic device, the method comprising:
   detecting that a charging clip is engaged on an edge of a structure comprising a plurality of conductive strips running perpendicular to the edge sufficiently close to the edge to engage a charging contact on the charging clip when clipped to the structure; and applying a positive charge to any of the conductive strips contacted by the charging contact.

19. The method of claim 18, further comprising detecting the polarity of the charging clip and connecting any conductive strips in contact with a negative contact on the charging clip to ground.

20. The method of claim 18, further comprising detecting the polarity of a portion of the charging clip and signalling a switch connected to at least one conductive strip in contact with the portion to connect the at least one conductive strip to ground or the direct current source such that the at least one conductive strip matches the polarity of the portion of the charging clip.

\* \* \* \* \*